(12) United States Patent
Zhang et al.

(10) Patent No.: US 11,904,423 B2
(45) Date of Patent: Feb. 20, 2024

(54) MACHINING PATH COORDINATION METHOD FOR BILATERAL ULTRASONIC ROLLING OF BLADE SURFACES

(71) Applicant: EAST CHINA UNIVERSITY OF SCIENCE AND TECHNOLOGY, Shanghai (CN)

(72) Inventors: Xiancheng Zhang, Shanghai (CN); Kaiming Zhang, Shanghai (CN); Shulei Yao, Shanghai (CN); Shuang Liu, Shanghai (CN); Feng Cheng, Shanghai (CN); Shantung Tu, Shanghai (CN)

(73) Assignee: EAST CHINA UNIVERSITY OF SCIENCE AND TECHNOLOGY (CN)

( * ) Notice: Subject to any disclaimer, the term of this patent is extended or adjusted under 35 U.S.C. 154(b) by 167 days.

(21) Appl. No.: 17/764,136

(22) PCT Filed: May 20, 2020

(86) PCT No.: PCT/CN2020/091264
§ 371 (c)(1),
(2) Date: Mar. 25, 2022

(87) PCT Pub. No.: WO2021/057050
PCT Pub. Date: Apr. 1, 2021

(65) Prior Publication Data
US 2022/0324067 A1   Oct. 13, 2022

(30) Foreign Application Priority Data

Sep. 27, 2019   (CN) .......................... 201910922505.6

(51) Int. Cl.
*B23P 9/02* (2006.01)

(52) U.S. Cl.
CPC ...................................... *B23P 9/02* (2013.01)

(58) Field of Classification Search
CPC .......... B23P 9/02; B23P 9/04; F05D 2230/26; G05B 2219/45147; G05B 19/4099; G06F 2119/18; F01D 5/286
See application file for complete search history.

(56) References Cited

U.S. PATENT DOCUMENTS

2005/0274011 A1   12/2005   Quellette

FOREIGN PATENT DOCUMENTS

| CN | 102096391 A | 6/2011 |
| CN | 106843140 A | 6/2017 |

(Continued)

OTHER PUBLICATIONS

International Search Report and Written Opinion with English Translation for PCT Application No. PCT/ CN2020/091264, dated Aug. 19, 2020, 13 pages.

*Primary Examiner* — Lee A Holly
(74) *Attorney, Agent, or Firm* — Dickinson Wright PLLC

(57) ABSTRACT

Provided is a bilateral ultrasonic rolling processing track coordination method for a blade surface, the method comprising: step S1, performing layering processing on a blade to acquire a contour curve of "A"-shaped and "n"-shaped blade edges of a blade model at different heights; step S2: determining the endpoints of a blade processing track; and step S3: planning the thickness and the rotation angle of the blade, comprising: step S31, solving a main direction angle $\alpha_{main}$ of the contour curve; step S32, solving the thickness d of the blade; step S33, solving a rotation angle required by blade processing when the blade edge is "A"-shaped; and step S34, solving the rotation angle required by blade processing when the blade edge is "n"-shaped. According to the method, blade deformation generated by an ultrasonic rolling force is reduced, the processing efficiency is (Continued)

improved, and the blade processing precision is also improved.

4 Claims, 5 Drawing Sheets

(56) References Cited

FOREIGN PATENT DOCUMENTS

| | | | |
|---|---|---|---|
| CN | 108279642 A | 7/2018 | |
| CN | 109800442 A | 5/2019 | |
| CN | 110202318 A | 9/2019 | |
| CN | 110704972 A | 1/2020 | |

MACHINING PATH COORDINATION METHOD FOR BILATERAL ULTRASONIC ROLLING OF BLADE SURFACES

CROSS-REFERENCE TO RELATED APPLICATIONS

This application is a National Stage Application of PCT Application No. PCT/CN2020/091264, filed on May 20, 2020, which claims priority to Chinese Application No. 201910922505.6, filed on Sep. 27, 2019, the disclosures of which are incorporated by reference herein in their entirety.

FIELD OF THE INVENTION

The present application relates to a field of blade machining and manufacturing, in particular to a machining path coordination method for bilateral ultrasonic rolling of blade surfaces.

BACKGROUND OF THE INVENTION

The blade is an important component of the engine of an airplane, and its surface quality will affect the service performance of the engine directly. In a working environment of high temperature, high pressure and high speed, the blade is easy to produce various defects, such as crack, wear, distortion, and ablation and so on. Blades contains huge economic and social benefits. Many countries in the world have invested a lot of manpower and financial resources to study the surface enhancement technology so as to prolong the service life of blades, and the basic method is to prolong the service life of blades by means of surface enhancement technique.

The ultrasonic rolling technology uses the combination of ultrasonic impact power and static load rolling to impact the surfaces of metal parts at a high speed, so as to produce larger plastic deformation on the surface material of the parts and form beneficial residual compressive stress after unloading, and the machined surfaces are strengthened. Compared with the traditional surface nanocrystallization method, this method can produce deeper residual compressive stress layers and strain hardening layers.

Ultrasonic rolling has been applied in the materials such as titanium alloy, 40Cr and duplex stainless steel. However, the traditional ultrasonic rolling technology is mostly used for parts like slender rods and thin-walled parts. The blade of the engine has free-form surface, and the change of the shape of the surface is complex. If unilateral ultrasonic surface rolling process is adopted, not only the machining efficiency is low, but also a constant pressure of about 300N is needed to be applied on the blade surface, which will cause blade deformation and affect the machining quality.

In the case of bilateral ultrasonic surface rolling process, firstly, two machining endpoints of the outside arc surface and inside arc surface of the blade are determined respectively, and then the double machining heads move from one machining endpoint to the other machining endpoint synchronously close to the outside arc surface and inside arc surface respectively. In practice, based on the machining path of the machining head on one side, the machining head on this side will definitely reach the machining endpoint. However, if the rotation angle of the blade is not reasonably planned and coordinated, the correct movement of the machining head on the other side cannot be guaranteed when the double machining heads move synchronously, and the machining head may cover the inner area of the blade edge (as shown in FIG. 1a) or not reach the machining endpoint, resulting in unmachined (as shown in FIG. 1b).

SUMMARY OF THE INVENTION

In order to solve the problem of the low machining efficiency and poor machining quality of the unilateral ultrasonic rolling process in the prior art, the present invention provides a machining path coordination method for bilateral ultrasonic rolling of blade surfaces.

The present invention provides a machining path coordination method for bilateral ultrasonic rolling of blade surfaces, which comprises: Step S1, layering a blade to obtain contour curves with shapes of "A" and "n" of blade edges at different heights of a blade model; Step S2, determining endpoints of machining paths of the blade; Step S3, planning blade thickness and rotation angle, which comprises: Step S31, obtaining main direction angle $\alpha_m$ of the contour curves; Step S32, solving the blade thickness d; Step S33, obtaining a rotation angle required for blade machining when the contour curve is in the shape of "A"; Step S34, obtaining a rotation angle required for the blade machining when the contour curve is in the shape of "n".

The step S1 comprises: Step S11, determining direction of the machining paths as the direction of blade width; Step S12, determining a machining area, setting a maximum value and a minimum value of height range of the blade required to be machined, and setting a layered starting point to be the minimum value; Step S13, determining layered interception interval; Step S14, intercepting the contour curves of the blade; Step S15, judging whether current height reaches the maximum value of the blade height range, if it does not reach, an interception interval is added to continue intercepting the contour curves of the blade, if it reaches, entering the step S2.

In the step S2, a radius comparison algorithm is adopted to determine the endpoints of the machining paths.

In the step S33, the rotation angle required for the blade machining when the contour curve is in the shape of "A" is $$\theta = \frac{\pi}{2} - \alpha_m,$$

wherein $\alpha_m$ is main direction angle of the contour curve.

The step S34 comprises: Step S341, setting most area of blade body as a main direction segment, setting area adjacent front and trailing edges as a vertical segment and setting area between the main direction segment and the vertical segment as a transition segment; Step S342, calculation method of rotation angle for blade machining of the main direction segment is consistent with that of the step S33; Step S343, the rotation angle for blade machining of the vertical segment is zero; Step S344, taking two points P and Q from the transition segment, wherein the point P is an end point of the vertical segment and the point Q is a starting point of the main direction segment, if there are m machining points between points P and Q, the blade will rotate with an interval of angle $$\theta_d = \left(\frac{\pi}{2} - \beta\right)/m,$$

wherein $\beta$ is main direction angle at the point Q.

In the step S13, the values of the layered interception interval are from 0.08 mm to 0.13 mm.

As to the machining path coordination method for bilateral ultrasonic rolling of blade surfaces provided by the present invention, the contour curves at different heights of the blade model are intercepted firstly, and the machining endpoints are determined secondly, and then the rotation angle for blade machining is planned, and all the machining is completed in a progressive manner finally. The present invention completes the ultrasonic rolling strength of the outside arc surface and inside arc surface of the blade at the same time by means of coordinating and planning the bilateral machining paths, which reduces the blade deformation produced by ultrasonic rolling pressure, improves machining efficiency and also improves the accuracy of blade machining.

BRIEF DESCRIPTION OF THE DRAWINGS

These and other features and advantages of this application will become more apparent to those skilled in the prior art from the detailed description of preferred embodiment. The drawings that accompany the description are described below.

DESCRIPTION OF THE PREFERRED EMBODIMENTS

The followings are used to further illustrate the present application with specific embodiments. It should be understood that the following embodiments is only used to explain the present application but not to limit the scope of the present application.

Figure 1A:
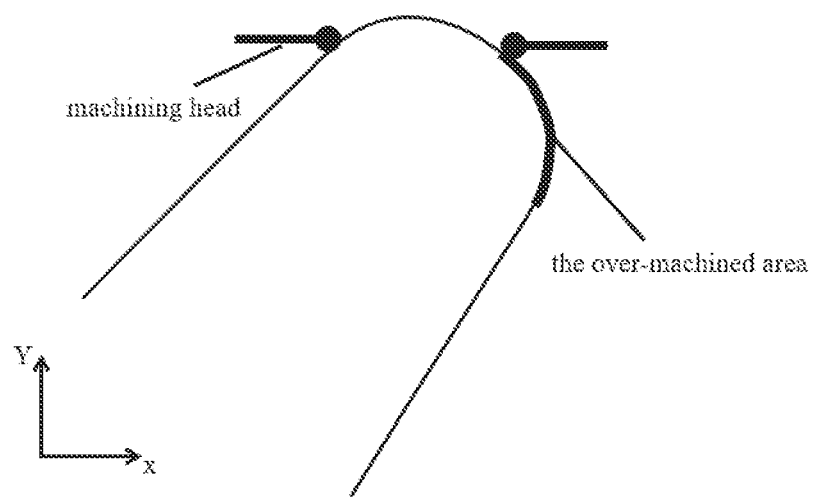
FIGS. 1(a) and 1(b) are schematic diagrams showing two kinds of improper machining cases when bilateral machining is adopted.
Figure 1B:
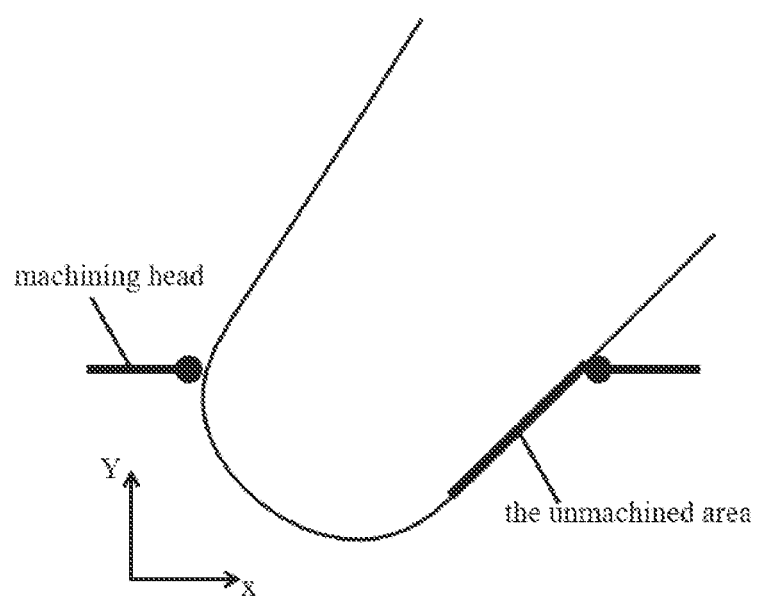
Figure 2:
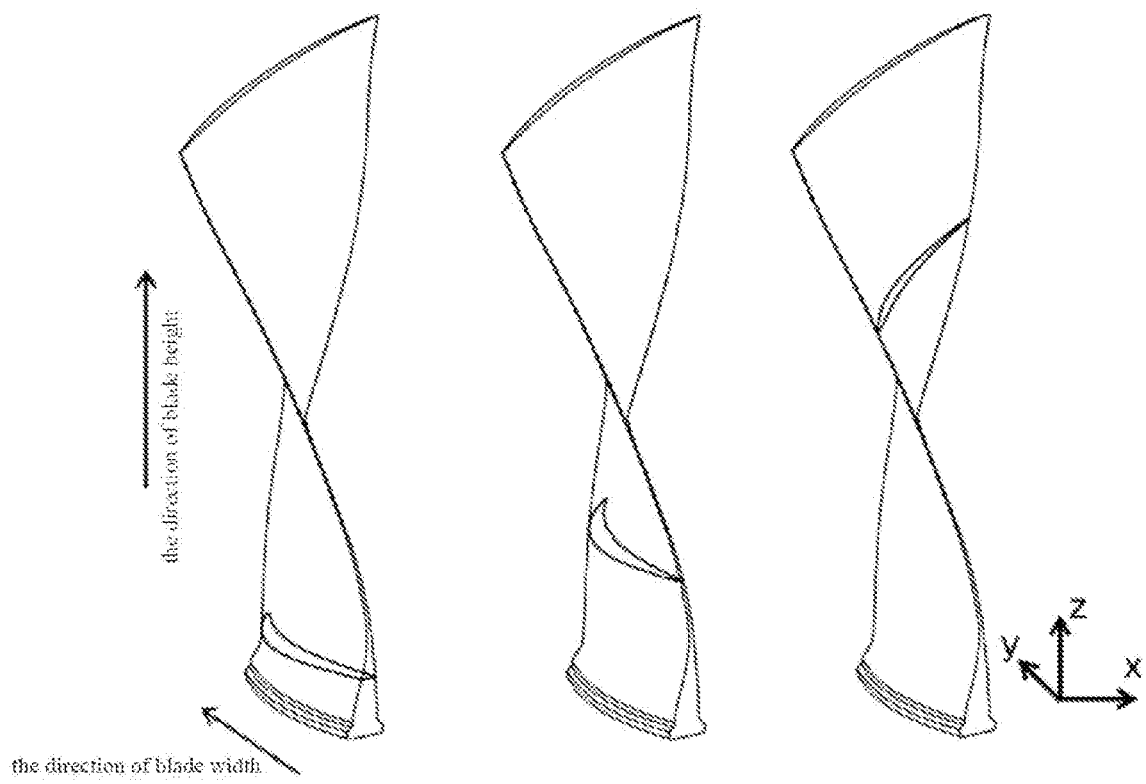
FIG. 2 shows contour curves obtained at different heights of the blade model according to the present invention.

The present invention provides a machining path coordination method for bilateral ultrasonic rolling of blade surfaces, which comprises the following steps:

Step S1: layering a blade to obtain contour curves at different heights of a blade model, as shown in FIG. 2, which specifically comprises:

Step S11: determining direction of machining paths. The machining paths of the blade can be designed along the direction of blade width or blade height: there are less reversing times of the paths along the direction of blade height, but long single moving paths, large machining range and high cumulative errors; there are short paths along the direction of blade width, but small machining range and low cumulative errors. Therefore, the direction of blade width is adopted as the design direction of the paths in the embodiment. The blade model is placed on the XY plane, Z axis represents the direction of blade height. The blade rotates around the Z axis during machining.

Step S12: determining a machining area. Selecting an area needs to be machined, setting a maximum value and a minimum value of blade height range, and setting the layered starting point to be the minimum value of the height range.

Step S13: determining the layer thickness, i.e., the layered interception interval. The layer thickness determines the machining efficiency and quality. With larger layer thickness, the machining efficiency is higher, while the machining quality is slightly lower. Considering to both the machining efficiency and the machining quality, in this embodiment, the layer thickness is set to be 0.1 mm. In other embodiments, the values of the layer thickness can be between 0.08 mm and 0.13 mm.

Step S14: intercepting the blade model, and the obtained countless intersection segments are connected to form the contour curve of the blade model at the plane.

Step S15: judging whether the current height reaches the maximum value of the blade height range. If it does not reach, an interception interval is added, such as 0.1 mm, if it reaches, the layering ends.

Figures 3A, 3B, 3C:
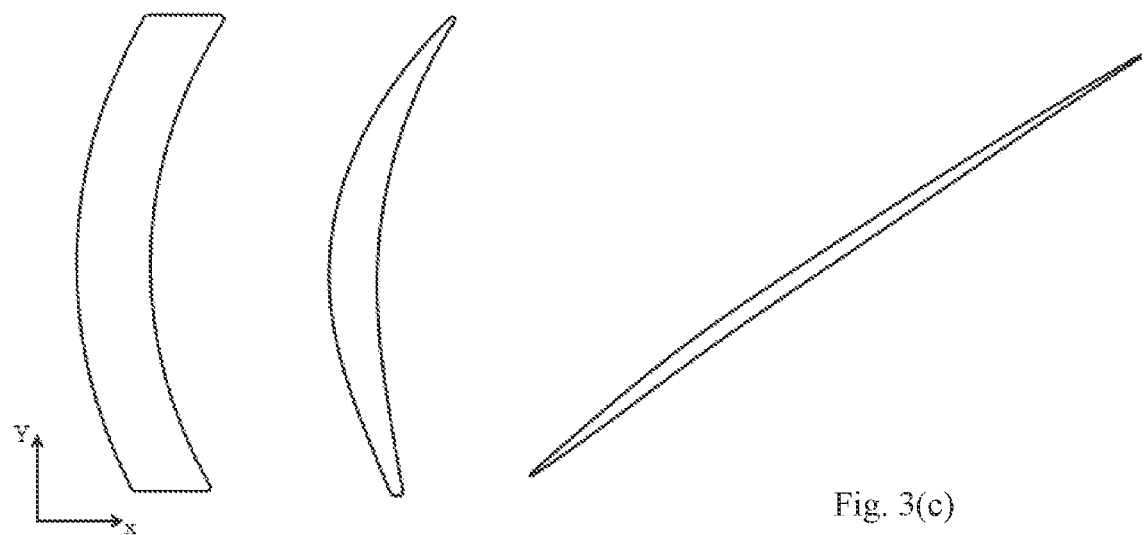
FIG. 3(a), FIG. 3(b), and FIG. 3(c) show three typical contour curves of blade sections according to the present invention.

As the blade profile is complex and its thickness changes along the direction of blade height, the structures of the contour curve of each layer are different. From the bottom to the tip, the section shape of the blade varies irregularly along the height. FIG. 3(a), FIG. 3(b), and FIG. 3(c) show three typical contour curves of the blade section: FIG. 3(a) shows the contour curve of the tenon at the blade root, which is used to connect the blade and blade disc, and its blade thickness is relative larger; the shapes of the leading edge and the trailing edge are similar to "n", which is wide, and the thickness of the blade body area of which varies gently. FIG. 3(b) shows the cross section of the middle area of the blade, which gradually transits from the blade root, and its leading edge is similar to "A" shape, with thin tip, and the thickness of the blade body area varies greatly, the overall trend is that the thickness of the middle area is larger, the thickness at the trailing edge is second, and the thickness adjacent to the leading edge is smaller. FIG. 3(c) shows the section contour curve of the top of the blade, where the section shape is long and narrow, the thickness is very thin, and the shapes of the leading edge and the trailing edge are similar to "A".

Step S2: determining the endpoints of the machining paths.

In the step S1, the three-dimensional model of the blade has been transformed into layers of contour curves with equal intervals, these curves are layers of continuous and uniform machining section contour curves. The blade of the engine of an airplane works in the harsh environments of high temperature, high pressure and high load, and its blade body area is easy to be damaged, thus it needs to be strengthened by means of ultrasonic rolling machining. During the ultrasonic rolling machining, it is very important to select the endpoint of the machining paths of each layer, the endpoint is required to be located at the junction of the blade edge and the blade body (the blade edge is non-machining area), and the adjacent endpoint between layers cannot fluctuate greatly.

Figure 4:
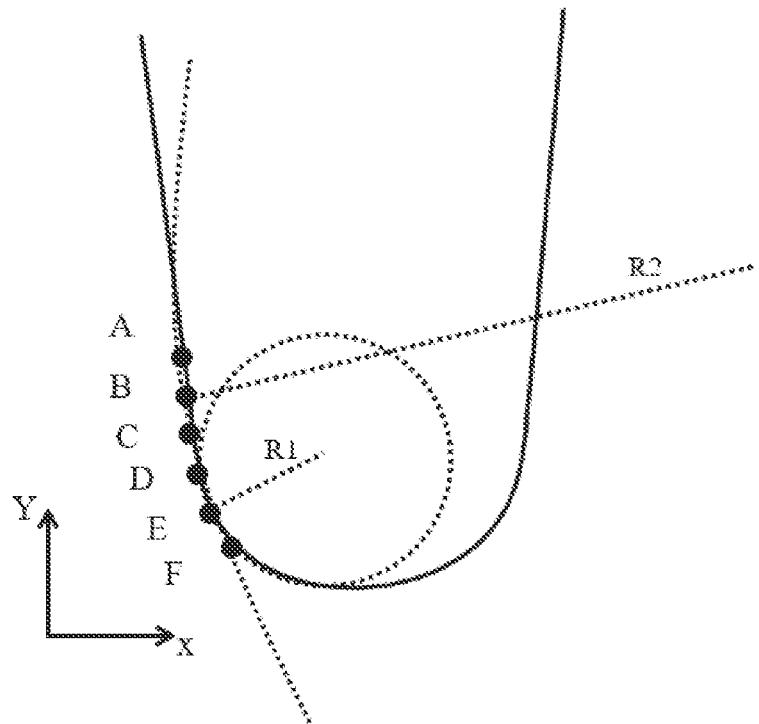
FIG. 4 is an enlarged schematic diagram of the junction between the blade edge and the blade body according to the present invention.

The radius comparison algorithm is adopted to determine the endpoints of the machining paths in the present invention, which can find the endpoints at the junction of any blade edge and the blade body. The principle is as follows: since the blade contour curve obtained in step S1 is composed of countless continuous line segments, take the endpoints of the line segments, and three continuous points can determine a circle. FIG. 4 is an enlarged schematic diagram of the junction between the blade edge and blade body, A, B and C are three continuous points in the blade body area. As the curvature of the blade body area is small, the radius of the circle according to points A, B and C is large, which is taken as R2. D, E and F are three continuous points in the blade edge area. As the curvature of the blade edge area is large, the radius of the circle according to points D, E and F is small, which is taken as R1. When R1<3 mm and R2>=3 mm, it can be determined that the machining endpoint of the blade contour curve of this layer is point D. In particular, since the front and the trailing edges are approximately an arc with a radius less than 3 mm, the endpoints at the leading edge and the trailing edge are the two ends of the arc. After the machining endpoints of the single layer of blade contour curve are determined, all the machining endpoints can be generated layer by layer according to the set layer interval.

During the machining, the blade rotates around the Z axis, the double machining heads are controlled by a synchronous motor to machine both sides of the blade at the same time, which reduces the deformation of the blade caused by unilateral machining. Since the shapes of the two sides of the blade are different, the machining paths of the double machining heads are also different. Based on the machining path of the machining head on one side, the machining path of the machining head on the other side is determined via the rotation angle for blade machining and the corresponding blade thickness.

Therefore, in step S3: planning the blade thickness and rotation angle.

Figure 5:
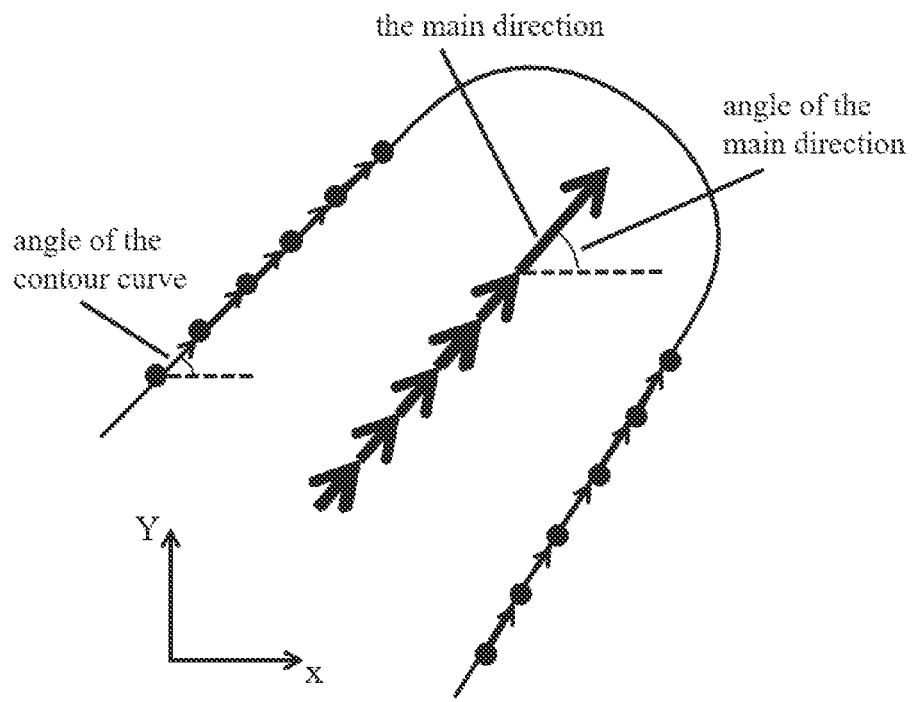
FIG. 5 is a schematic diagram for solving the main direction angle according to the present invention.

First, in step S31, obtaining the main direction angle. The concept of blade main direction is proposed here. The blade main direction is a comprehensive trend that can be used to replace curves on both sides of the blade contour. Due to the curves on both sides of the blade are irregular symmetrical, their comprehensive trend (i.e., the main direction) is also changing. The specific solution method of the main direction is shown in FIG. 5. The average value of the angles of the contour curve of the corresponding area is obtained, which is the main direction angle $\alpha_m$. During the machining of most area of the blade body, the horizontal lines between the machining heads is kept to be perpendicular to the main direction in real time to realize bilateral coordinate machining.

Figure 6:
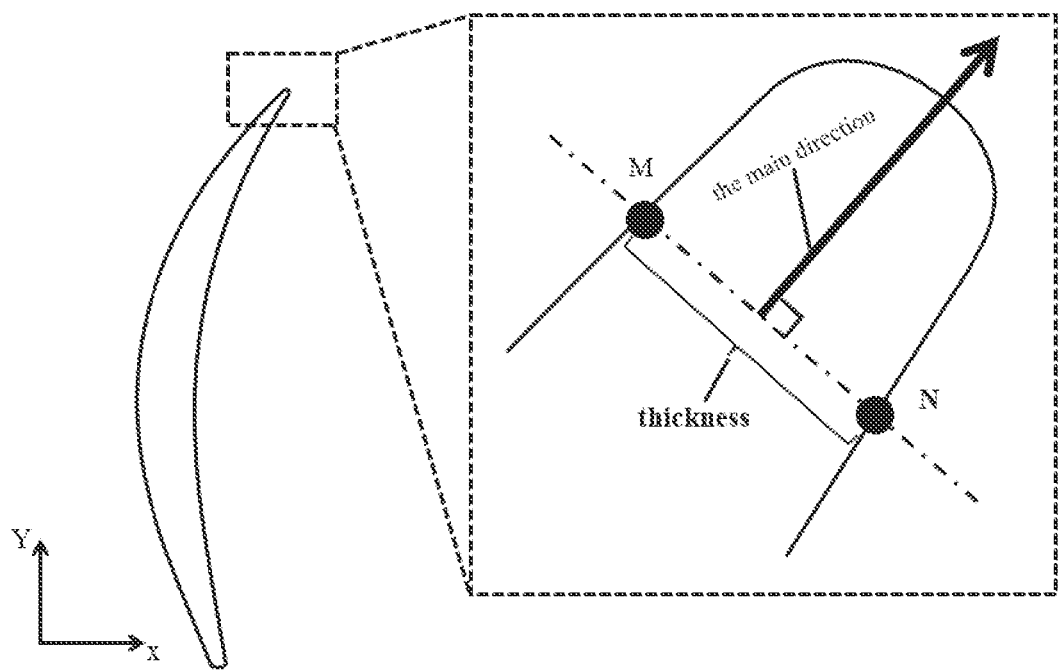
FIG. 6 is a schematic diagram for solving the blade thickness according to the present invention.

The step S32 for solving the blade thickness is: making a straight line perpendicular to the main direction of a point M through the point M of the blade body area, which intersects the other side of the contour curve at point N, the length of the line segment MN is the blade thickness d, as shown in FIG. 6.

Figure 7:
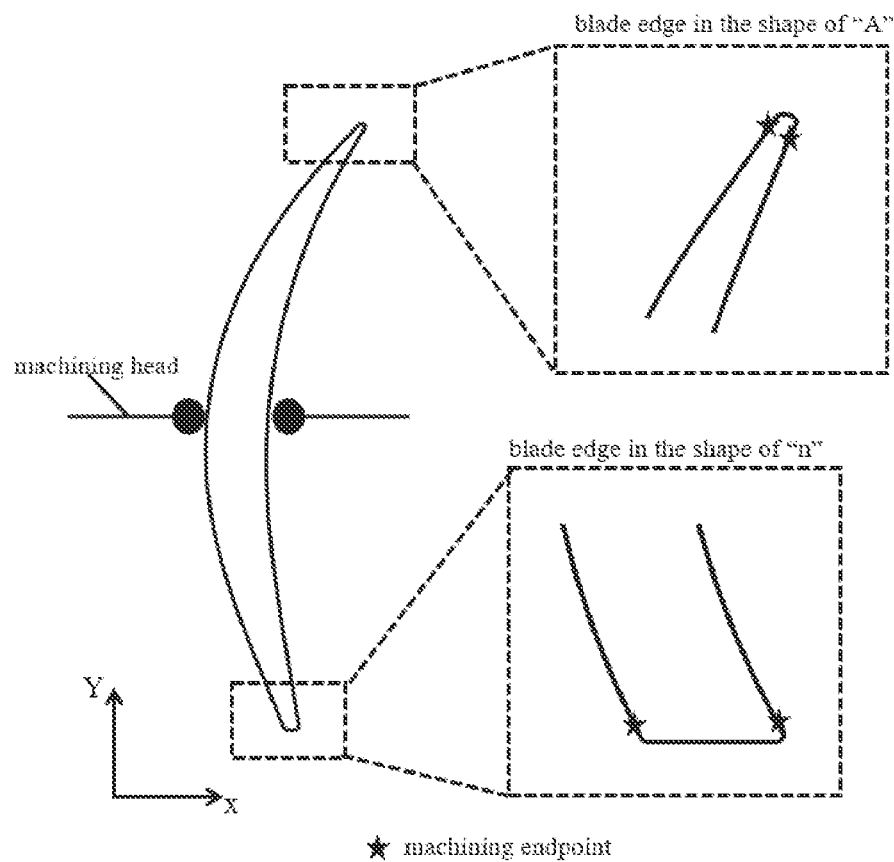
FIG. 7 is a machining schematic diagram of the blade edges in the shapes of "n" and "A" according to the present invention.

According to the previous analysis, except that the leading edge and the trailing edge of the tenon are in the shape of "n", the leading and trailing edges of other places are in the shape of "A", or one edge is in the shape of "n" and the other edge is in the shape of "A". Therefore, it is discussed in two cases, as shown in FIG. 7:

1) When the Blade Edge is in the Shape of "A"

Step S33, the required rotation angle of the blade during machining is:

$$\theta = \frac{\pi}{2} - \alpha_m.$$

In this case, after the blade rotates, the main direction at the machining point remains real-time vertical to the horizontal connecting line of the double machining heads, and the machining blind areas are greatly reduced, so that the machining requirements are met.

2) When the Blade Edge is in the Shape of "n"

Figure 8:
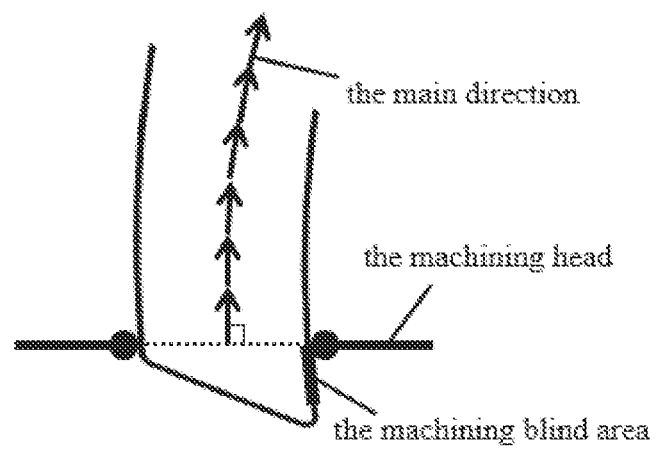
FIG. 8 is a schematic diagram of machining blind area of the leading and trailing edges in the shape of "n" according to the present invention.

As to the blade edge area in the shape of "n", the method in step S33 still cannot meet the machining requirements. As shown in FIG. 8, when machining is carried out at the angle that the horizontal connecting line of the double machining heads is perpendicular to the main direction, the machining head on the left side has reached the endpoint of the machining area of this side, while the right side still has machining blind areas.

Figure 9:
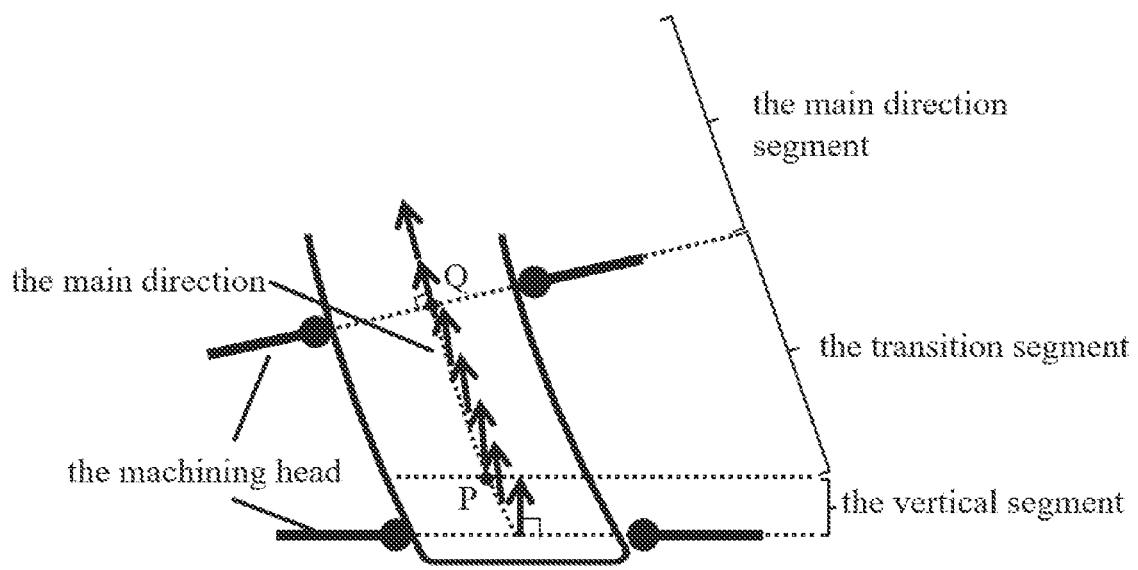
FIG. 9 is a schematic diagram of the planned rotation angle for blade machining when the blade edge is in the shape of "n" according to the present invention.

Therefore, in step S341, the machining area is segmented, as shown in FIG. 9, most area of the blade body is a main direction segment, the area adjacent the blade edge is a vertical segment, the area between the main direction segment and the vertical segment is a transition segment, then the rotation angles of the three segments are planned respectively.

Step S342: for the main direction segment, the planning method of the rotation angle is consistent with that in the step S33.

Step S343: in the vertical segment, that the blade does not rotate can ensure that the machining heads reach the endpoints of the machining areas of both ends.

Step S344: the transition segment is used to smoothly transition the rotation angle when changing from the vertical segment to the main direction segment. As shown in FIG. 9, in the area of the transition segment, point P is the end point of the vertical segment, where the blade does not rotate and its rotation angle is zero. Point Q is the starting point of the main direction segment, the main direction angle of this position is calculated as β, and its rotation angle is further calculated as $$\left(\frac{\pi}{2} - \beta\right).$$

If there are m machining points between points P and Q, the rotation angle difference between each two adjacent machining points is:

$$\theta_d = \left(\frac{\pi}{2} - \beta\right) \bigg/ m.$$

Thus, the rotation angle of the blade changes lineally from the end point of the vertical segment to the starting point of the main direction for a smooth transition in the area of the transition segment with an interval $\theta_d$.

After planning the machining paths of single layer, the machining is carried out in a progressive manner and the machining heads move continuously according to "zigzag" paths.

The foregoing application has been described in accordance with the relevant legal standard, thus the description is exemplary rather than limiting in nature. Variations and modifications to the disclosed embodiment may become apparent to those skilled in the prior art and do come within the scope of the application. Accordingly, the scope of legal protection afforded this application can only be determined by studying the following claims.

The invention claimed is:

1. A machining path coordination method for bilateral ultrasonic rolling of blade surfaces, comprising:
   Step S1, layering a blade to obtain contour curves with shapes of "A" and "n" of blade edges at different heights of a blade model;
   Step S2, determining endpoints of machining paths of the blade;
   Step S3, planning blade thickness and rotation angle, which comprising:
   Step S31, obtaining main direction angle $\alpha_m$ of the contour curves;
   Step S32, solving the blade thickness d;
   Step S33, obtaining a rotation angle θ required for blade machining when the contour curve is in the shape of "A", $$\theta = \frac{\pi}{2} - \alpha_m,$$

wherein $\alpha_m$ is main direction angle of the contour curve;
   Step S34, obtaining a rotation angle required for blade machining when the contour curve is in the shape of "n"; the step S34 comprising:
   Step S341, setting most area of blade body is set as a main direction segment, setting area adjacent front and rear edges as a vertical segment and setting area between the main direction segment and the vertical segment as a transition segment;
   Step S342, calculation method of rotation angle for blade machining of the main direction segment is consistent with that of the step S33;
   Step S343, the rotation angle for the blade machining of the vertical segment is zero;
   Step S344, taking two points P and Q from the transition segment, wherein the point P is an end point of the vertical segment and the point Q is a starting point of the main direction segment, if there are m machining points between points P and Q, the blade will rotate with an interval of angle $$\theta_d = \left(\frac{\pi}{2} - \beta\right)/m,$$

wherein β is the main direction angle at the point Q.

2. The machining path coordination method for bilateral ultrasonic rolling of blade surfaces according to claim 1, wherein the step S1 comprising:
   Step S11, determining direction of the machining paths as the direction of blade width;
   Step S12, determining a machining area, setting a maximum value and a minimum value of height range of the blade required to be machined, and setting a layered starting point to be the minimum value;
   Step S13, determining layered interception interval;
   Step S14, intercepting the contour curve of the blade;
   Step S15, judging whether current height reaches the maximum value of the blade height range, if it does not reach, an interception interval is added to continue intercepting the contour curves of the blade, if it reaches, performing the step S2.

3. The machining path coordination method for bilateral ultrasonic rolling of blade surfaces according to claim 1, in the step S2, a radius comparison algorithm is adopted to determine the endpoints of the machining paths.

4. The machining path coordination method for bilateral ultrasonic rolling of blade surfaces according to claim 2, in the step S13, the values of the layered interception interval are from 0.08 mm to 0.13 mm.

* * * * *